(12) United States Patent
Tsai et al.

(10) Patent No.: US 10,355,541 B2
(45) Date of Patent: Jul. 16, 2019

(54) AXIAL FLUX MACHINE

(71) Applicant: DELTA ELECTRONICS, INC., Taoyuan (TW)

(72) Inventors: Ching-Hsiung Tsai, Taoyuan (TW); Chu-Ju Li, Taoyuan (TW); You-Chiuan Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 75 days.

(21) Appl. No.: 15/802,446

(22) Filed: Nov. 2, 2017

(65) Prior Publication Data
US 2018/0301947 A1   Oct. 18, 2018

(30) Foreign Application Priority Data

Apr. 14, 2017 (CN) ........................ 2017 1 0245471

(51) Int. Cl.
*H02K 1/22* (2006.01)
*H02K 1/18* (2006.01)
(Continued)

(52) U.S. Cl.
CPC ............. *H02K 1/182* (2013.01); *H02K 1/141* (2013.01); *H02K 1/148* (2013.01); *H02K 1/2793* (2013.01); *H02K 3/26* (2013.01); *H02K 3/325* (2013.01); *H02K 15/02* (2013.01); *H02K 21/042* (2013.01); *H02K 21/24* (2013.01); *H02K 16/02* (2013.01); *H02K 49/102* (2013.01); *H02K 2213/12* (2013.01)

(58) Field of Classification Search
CPC ........ H02K 15/02; H02K 16/02; H02K 1/141; H02K 1/148; H02K 1/182; H02K 1/2793; H02K 21/042; H02K 21/24; H02K 2213/12; H02K 3/26; H02K 3/325; H02K 49/102
See application file for complete search history.

(56) References Cited

U.S. PATENT DOCUMENTS 4,423,359 A * 12/1983 Hashimoto ............ G11B 15/26
                                                              310/118
5,397,953 A *  3/1995 Cho ........................ H02K 1/02
                                                              310/156.35
(Continued)

FOREIGN PATENT DOCUMENTS

EP           0729663 B1   12/2001

*Primary Examiner* — Yuriy Semenenko
(74) *Attorney, Agent, or Firm* — CKC & Partners Co., LLC (57) ABSTRACT

An axial flux machine includes a modulated stator, a rotor, and a plurality of spacers. The modulated stator includes plural stator units. Each stator unit includes a magnetic core and at least one winding. The magnetic core has first plate, a second plate, and a sidewall connecting the first plate to the second plate, and the winding is disposed on the magnetic core. The stator units construct the modulated stator. By modulating the stator, the slot fill factor and the cogging torque performance can be improved. The spacers are disposed to isolate the magnetic cores. The rotor is disposed in the modulated stator and includes plural first magnetic pieces and second magnetic pieces arranged alternately, and the magnetic flux lines of the first and second magnetic pieces respectively pass through sidewalls of the magnetic cores to construct C-type magnetic loops of opposite directions thereby improving power density.

10 Claims, 5 Drawing Sheets

(51) Int. Cl.
*H02K 21/24* (2006.01)
*H02K 15/02* (2006.01)
*H02K 1/14* (2006.01)
*H02K 21/04* (2006.01)
*H02K 1/27* (2006.01)
*H02K 3/26* (2006.01)
*H02K 3/32* (2006.01)
H02K 16/02 (2006.01)
H02K 49/10 (2006.01)

(56) References Cited

U.S. PATENT DOCUMENTS

| | | | | |
|---|---|---|---|---|
| 6,445,105 B1* | 9/2002 | Kliman | ............... | H02K 1/14 310/156.35 |
| 7,221,073 B2* | 5/2007 | Yamada | ............ | H02K 1/148 310/194 |
| 7,608,965 B2* | 10/2009 | Aydin | ............... | H02K 21/24 210/266 |
| 7,629,724 B2* | 12/2009 | Tanno | ............... | H02K 21/24 310/156.13 |
| 7,638,919 B2 | 12/2009 | Pulnikov et al. | | |
| 7,960,884 B2* | 6/2011 | Miyata | ............ | H02K 1/2793 310/114 |
| 8,373,319 B1* | 2/2013 | Barnes | ............... | H02K 21/14 310/112 |
| 2008/0278020 A1* | 11/2008 | Ley | ............ | H02K 1/148 310/156.36 |
| 2010/0148611 A1* | 6/2010 | Wang | ............... | H02K 1/14 310/156.37 |
| 2012/0126653 A1* | 5/2012 | Yang | ............... | H02K 1/146 310/156.32 |
| 2013/0200744 A1* | 8/2013 | Miyamura | ......... | H02K 19/06 310/210 |

* cited by examiner

AXIAL FLUX MACHINE

RELATED APPLICATIONS

This application claims priority to China Application Serial Number 201710245471.2, filed Apr. 14, 2017, which is herein incorporated by reference.

BACKGROUND

Field of Invention

The present invention relates to a flux machine. More particularly, the present invention relates to an axial flux machine.

Description of Related Art

Motors are common rotary machines. The motor typically includes a stator, a rotor, at least one winding disposed at the stator, and a plurality of magnetic pieces at the rotor. The motor generates alternating magnetic flux by conducting current and converts the electricity energy into mechanical energy.

The motors can be grouped by the magnetic line directions (e.g. the flux directions), such as radius motors and axial motors, which respectively have manufacturing problems to be solved in the industry. For example, the air gap is an important factor to determine the characteristic of the traditional radius motor, and the shapes of the magnetic pieces are complicate, and the fabrication thereof is also difficult. The motor length of the radius motor is longer than the motor length of the axial motor. On the other hand, in the traditional axial motor, there must be sufficient spaces between the shoes of the magnetic core for allowing the winding tool passing through during the winding process, and the winding angle of the winding tool is limited by the spaces. Thus the slot space factor of the traditional axial motor is poor.

Therefore, there is a need to improve the fabrication and assembly efficiencies of motors.

SUMMARY

According to an aspect of the invention, an axial flux machine includes a modulated stator, a rotor, and a plurality of spacers. The modulated stator includes a plurality of stator units, and each of the stator unit includes a first magnetic core, a first winding disposed in the first magnetic core, a second magnetic core, and a second winding disposed in the second magnetic core. The first core has a first plate and a first sidewall, wherein a first end of the first plate is connected to a first end of the first sidewall, and a cross-section of the first magnetic core is L-shaped. The second magnetic core has a second plate and a second sidewall, wherein a first end of the second plate is connected to a first end of the second sidewall, and a cross-section of the second magnetic core is L-shaped. A second end of the first sidewall is physically in contact with a second end of the second sidewall. The spacers are disposed to isolate the first magnetic cores and to isolate the second magnetic cores. The stator is disposed between the first magnetic core and the second magnetic core. The rotor includes a plurality of first magnetic pieces and a plurality of second magnetic pieces arranged alternately, wherein magnetic flux lines of the first magnetic pieces and the second magnetic pieces respectively pass through the first sidewall and the second sidewall to construct a plurality of C-type magnetic loops with opposite magnetic directions.

According to another aspect of the invention, an axial flux machine includes a modulated stator, a plurality of spacers, and a rotor. The modulated stator includes a plurality of stator units, and each of the stator units includes a magnetic core and at least one winding disposed in the magnetic core. The magnetic core includes a first plate, a second plate, and a sidewall connecting the first plate to the second plate, wherein the first plate is substantially parallel to the second plate. The spacers are disposed to isolate the magnetic cores. The rotor is disposed in the modulated stator, and the rotor includes a plurality of first magnetic pieces and a plurality of second magnetic pieces arranged alternately, wherein magnetic flux lines of the first magnetic pieces and the second magnetic pieces respectively pass through the first sidewall and the second sidewall to construct a plurality of C-type magnetic loops with opposite magnetic directions.

DESCRIPTION OF THE EMBODIMENTS

Figure 1:
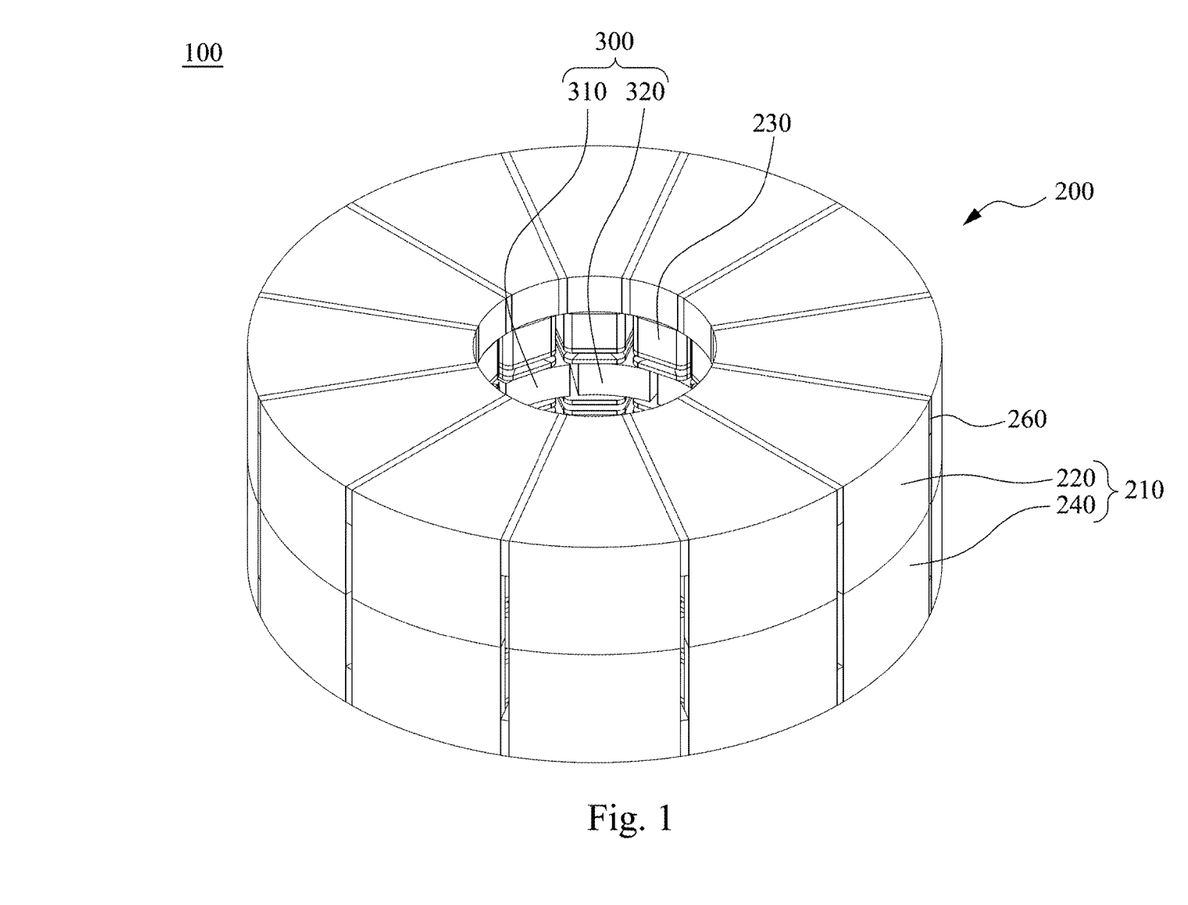
FIG. 1 is an oblique view of an embodiment of an axial flux machine of the invention.
Figure 2:
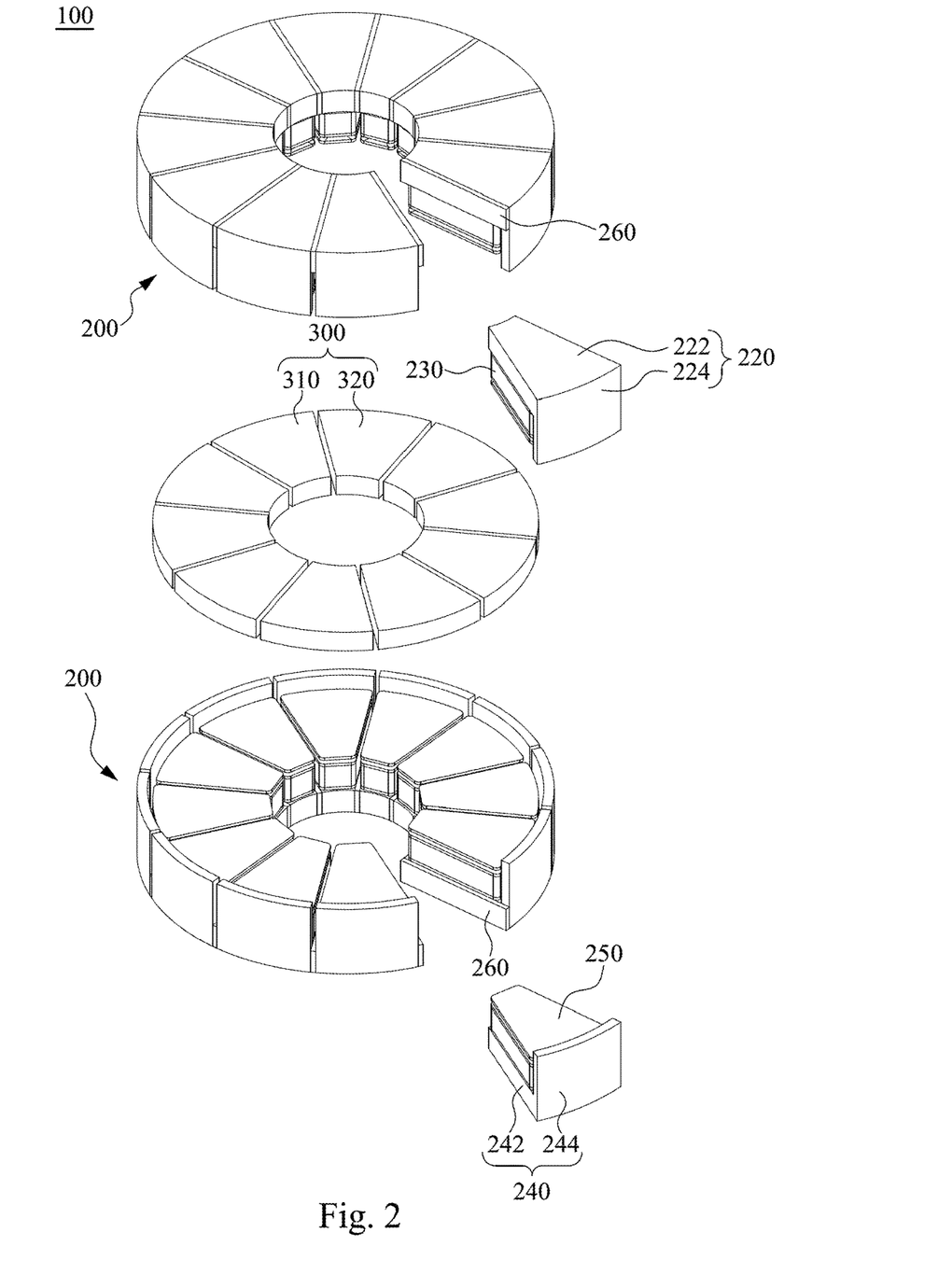
FIG. 2 is an explosive view of the embodiment of the axial flux machine of the invention.

Referring to FIGS. 1 and 2, which respectively are oblique view and explosive view of an embodiment of an axial flux machine of the invention. The axial flux machine 100 includes a modulated stator 200 and a rotor 300. The modulated stator 200 includes a plurality of stator units 210. The rotor 300 is disposed in the modulated stator 200 and is rotated relative to the modulated stator 200.

Each of the stator units 210 of the modulated stator 200 has substantially the same shape and the same size. In some embodiments, each of the stator units 210 has a wedge shape, from top view, and the stator units 210 construct a ring shape stator structure. In some embodiments, each of the stator units 210 includes a first magnetic core 220, a first winding 230 disposed on the first magnetic core 220, a second magnetic core 240, and a second winding 250 disposed on the second magnetic core 240. The rotor 300 is configured between the first winding 230 and the second winding 250.

The first magnetic core 220 has an L-shaped cross-section, and the second magnetic core 240 has an L-shaped cross-section. A first end of the first magnetic core 220 is physically connected to a first end of the second magnetic core 240, such that a cross-sectional view of the combination of the first magnetic core 220 and the second magnetic core 240 is a C shape. In some embodiments, the first magnetic core 220 includes a first plate 222 and a first sidewall 224. An end of the first plate 222 is connected to an end of the first sidewall 224, thus the cross-section of the first magnetic core 220 is an L shape. The second magnetic core 240 includes a second plate 242 and a second sidewall 244. An end of the second plate 242 is connected to an end of the second sidewall 244, thus the cross-section of the second magnetic core 240 is an L shape. Another end of the first sidewall 224 is connected to another end of the second sidewall 244, thus the cross-section of the combination of the first magnetic core 220 and the second magnetic core 240 is a C shape. In some embodiments, the first plate 222 of the first magnetic core 220 is substantially parallel to the second plate 242 of the second magnetic core 240.

The material of the first magnetic core 220 and the second magnetic core 240 can be soft magnetic composite material. In some embodiments, the first magnetic core 220 and the second magnetic core 240 can be a dust core, a ferrite core, a magnetic glass core, an alloy core, or the like. In some embodiments, the first magnetic core 220 is formed integrally, and the second magnetic core 240 is formed integrally. In the first magnetic core 220, the thicknesses of the first plate 222 and the first sidewall 224 can be the same or different. In the second magnetic core 240, the thicknesses of the second plate 242 and the second sidewall 244 can be the same or different.

The modulated stator 200 further includes a plurality of spacers 260. The spacers 260 are disposed between the stator units 210 to isolate the stator units 210. The spacers 260 are made of non-magnetic material, such as plastic, glues, foams, or the like. In some embodiments, the spacers 260 are disposed at the side surfaces of the first magnetic core 220 and the second magnetic core 240, such that the adjacent stator units 210 are isolated by the spacers 260.

The rotor 300 is disposed between the first magnetic core 220 and the second magnetic core 240. The rotor 300 includes a plurality of first magnetic pieces 310 and a plurality of second magnetic pieces 320 arranged alternately. The first magnetic pieces 310 and the second magnetic pieces 320 can be substantially the same permanent magnets arranged to have opposite magnetic line directions. For example, the first magnetic pieces 310 are arranged to have the north poles facing the first magnetic cores 220 and the south poles facing the second magnetic cores 240 while the second magnetic pieces 320 are arranged to have the south poles facing the first magnetic cores 220 and the north poles facing the second magnetic cores 240. Namely, the first magnetic pieces 310 and the second magnetic pieces 320 of the rotor 300 are arranged to have alternate north poles and south poles.

The number of the stator units 210 of the modulated stator 200 can be the same of or different from the number of the pairs of the first magnetic pieces 310 and the second magnetic pieces 320 of the rotor 300. The number of the stator units 210 of the modulated stator 200, which can be regarded as the number of the slots of the windings, and the number of the pairs of the first magnetic pieces 310 and the second magnetic pieces determine the slot-pole ratio of the axial flux machine 100 and the electrical angle of the windings. For example, there are twelve stator units 210 in the modulated stator 200, which means the number of the stator slot is twelve. The sum of the number of the first magnetic pieces 310 and the second magnetic pieces 320 of the rotor 300 is ten, which means the number of the pole pairs is five. As a result, the electrical angle of each of the windings is 150 degrees.

Figure 3:
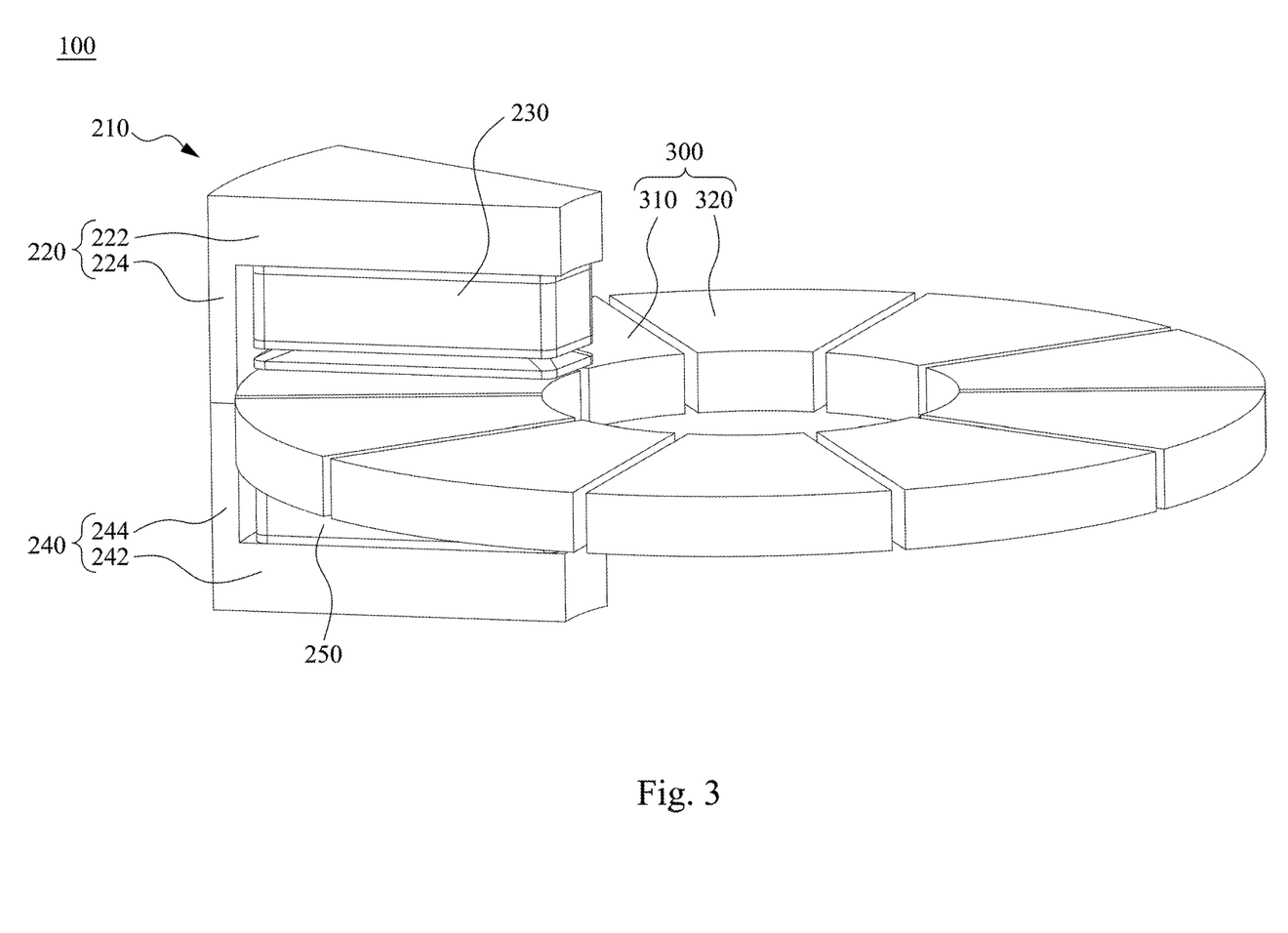
FIG. 3 is a schematic diagram of an embodiment of a magnetic flux path of the axial flux machine of the invention.

Reference is made to FIG. 3, which is a schematic diagram of an embodiment of a magnetic flux path of the axial flux machine of the invention. In order to clearly show the features of the disclosure, only one stator unit 210 is illustrated in the drawing, other stator units 210 are not illustrated.

In some embodiments, the cross-sections of the first magnetic core 220 and the second magnetic core 240 are L shape. An end of the first magnetic core 220 is physically in contact with an end of the second magnetic core 240 when the first magnetic core 220 is coupled to the second magnetic core 240, and the magnetic flux path is constructed by the first magnetic core 220 and the second magnetic core 240.

For example, the first magnetic pieces 310 are arranged to have the north poles facing the first magnetic cores 220 and the south poles facing the second magnetic cores 240. Therefore, the magnetic flux lines of the first magnetic pieces 310 are emitted from the top surface of the first magnetic pieces 310 and sequentially pass through the first windings 230, the first plates 222, the first sidewalls 224, the second sidewalls 244, the second plates 242, and the second windings 250, and return to the bottom surface of the first magnetic pieces 310. Similarly, the second magnetic pieces 320 are arranged to have the south poles facing the first magnetic cores 220 and the north poles facing the second magnetic cores 240, Therefore, the magnetic flux lines of the second magnetic pieces 320 are emitted from the bottom surface of the second magnetic pieces 320 and sequentially pass through the second windings 250, the second plates 242, the second sidewalls 244, the first sidewalls 224, the first plates 222, and the first windings 230, and return to the top surface of the second magnetic pieces 320.

As discussed above, the first magnetic core 220 and the second magnetic core 240 construct a C-type magnetic core in the axial flux machine 100. The adjacent first magnetic cores 220 and the adjacent second magnetic cores 240 are spaced by the spacers 260. Thus the magnetic lines of the first magnetic pieces 310 and/or the second magnetic pieces 320 of each of the stator units 210 are guided by the first magnetic core 220 and the second magnetic core 240, and the magnetic lines of the first magnetic pieces 310 and the second magnetic pieces 320 respectively pass through the sidewall of the magnetic core and construct C-type magnetic loops, in which the directions of the C-type magnetic loops of the first magnetic pieces 310 and the second magnetic pieces are opposite to each other.

On the other hand, the magnetic core of the traditional axial flux machine includes two magnetic discs. That is, the traditional axial flux machine does not include the sidewalls in the magnetic core and the spacers. Therefore, the magnetic lines of the traditional axial flux machine are substantially perpendicular to the radius direction at the position near the top surface or the bottom surface of the magnetic pieces, and the magnetic lines penetrate adjacent magnetic pieces and return to the magnetic piece where the magnetic lines are emitted from.

In the embodiments of the present disclosure, the axial flux machine has the sidewalls in the magnetic cores and the spacers between the magnetic cores. Therefore, the magnetic lines of each of the magnetic pieces are substantially parallel to the radius direction at the position near the top surface or the bottom surface of the magnetic pieces (e.g. near the first plates 222 and the second plates 242), and the magnetic lines of each of the magnetic pieces penetrate the sidewalls (e.g. the first sidewalls 224 and the second sidewalls 244) and return to the magnetic piece where the magnetic lines are emitted from. That is, the magnetic lines do not penetrate the adjacent magnetic pieces. Such C-type magnetic loops may improve the power density of the axial flux machine 100.

Figure 4:
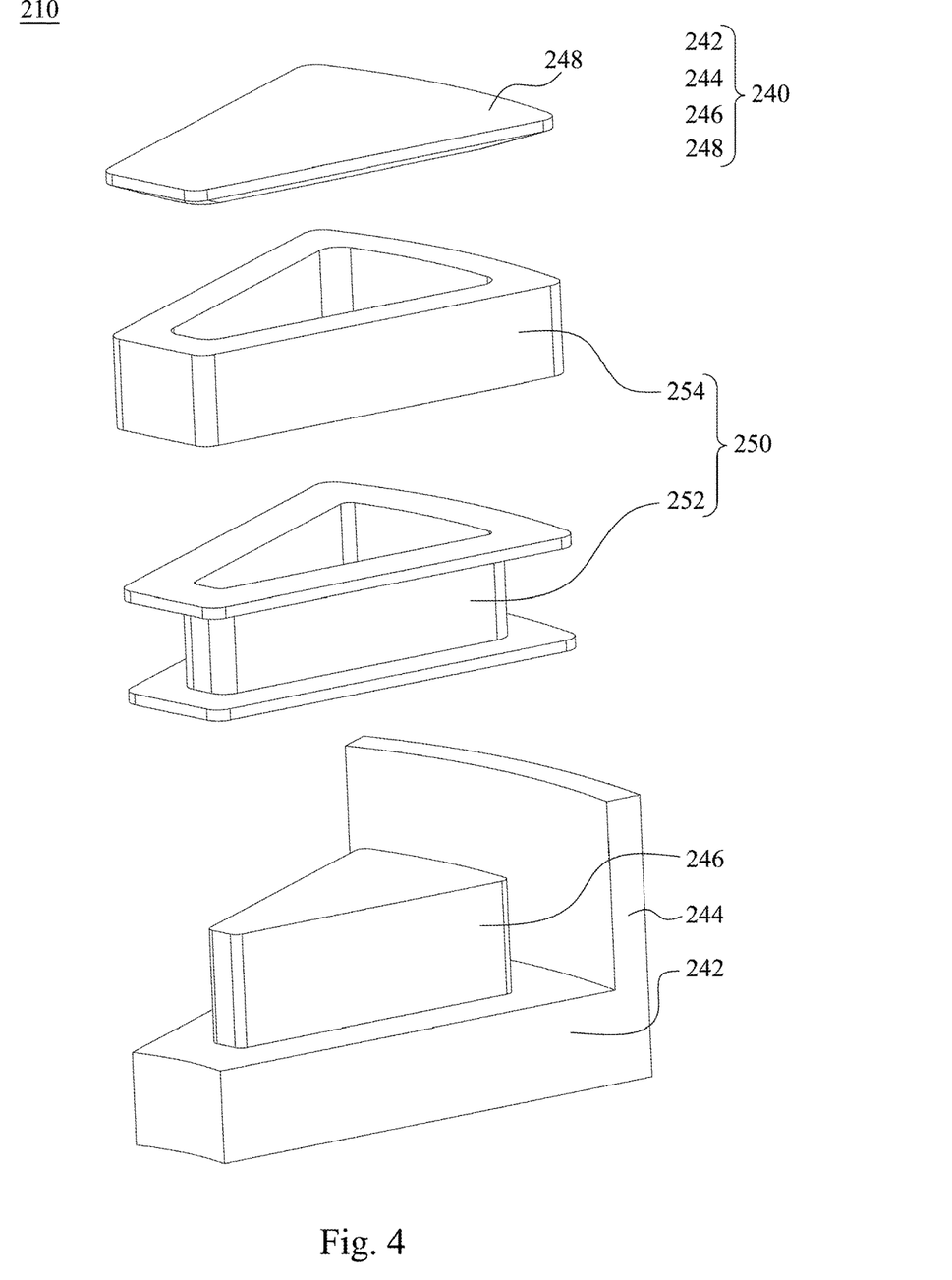
FIG. 4 is an explosive view of an embodiment of the winding of the axil flux machine of the invention.

Reference is made to FIG. 4, which is an explosive view of an embodiment of the winding of the axil flux machine of the invention. The stator of the axial flux machine 100 is modulated and includes plural stator units. In some embodiments, the winding of the stator unit is detachably assembled to the magnetic core. The winding can be one of the first windings 230 and the second windings 250, and the magnetic core can be one of the first magnetic cores 220 and the second magnetic cores 240. For the sake of description, the assembly of the second winding 250 and the second magnetic core 240 is discusses, but the structure can be regarded as an upside down structure of the assembly of the first winding 230 and the first magnetic core 220. Therefore, the assembly of the first winding 230 and the first magnetic core 220 is similar to the assembly of the second winding 250 and the second magnetic core 240 and is not repeated again.

In some embodiments, the second magnetic core 240 includes the second plate 242, the second sidewall 244, and a tooth 246 disposed on the second plate 242. The second winding 250 includes a coil rack 252 and coils 254. In some embodiments, the coils 254 include conductive material, and the coils 254 may include enameled wires or metallic conduits. In some embodiments, the coils 254 are wound on the coil rack 252, and then the coil rack 252 is coupled to the tooth 246 of the second magnetic core 240. The second magnetic core 240 may optionally include a shoe 248. The shoe 248 is coupled to the tooth 246 after the coil rack 252 is positioned, such that the coil rack 252 and the coils 254 thereon are fastened on the second magnetic core 240.

In some other embodiments, the coil rack of the winding can be directly bond on the plate of the magnetic core. For example, the coil rack 252 can be directly bonded on the second plate 242 by a gluing or a soldering process, and then the coils 254 are wounded on the coil rack 252 by a winding process. The tooth 246 can be utilized to position the coil rack 252 when the coil rack 252 is bonded on the second plate 242, and the shoe 248 can be utilized to position the coils 254 between the shoe 248 and the second plate 242.

As described above, the stator of the axial flux machine is modulated and includes plural stator units. The windings are respectively wound on the first magnetic cores and the second magnetic cores during the winding process. Then the first magnetic cores are assembled to the second magnetic cores and become the stator units, and the stator units construct the modulated stator. Therefore, the operation spaces between the shoes for allowing the winding tool passing through can be shortened, and the winding angle of winding tool is no longer limited. The area of the shoes are also increased because the spaces therebetween are shortened, thus the slot space factor of the modulated stator can be increased accordingly. Furthermore, the cogging torque characteristic of the axial flux machine is also improved due to the increased shoe area. In some embodiments, the winding of the stator unit is detachably assembled at the magnetic core. Namely, the coils can be wound on the coil rack before the coil rack is coupled to the tooth of the stator unit, and thus the process of coils winding can be simplified. The modulated assembly process, as described above, can simplify the assembling process and improved the assembling efficiency. The axial flux machine fabricated by above process may have better slot space factor and better cogging torque characteristic.

Figure 5:
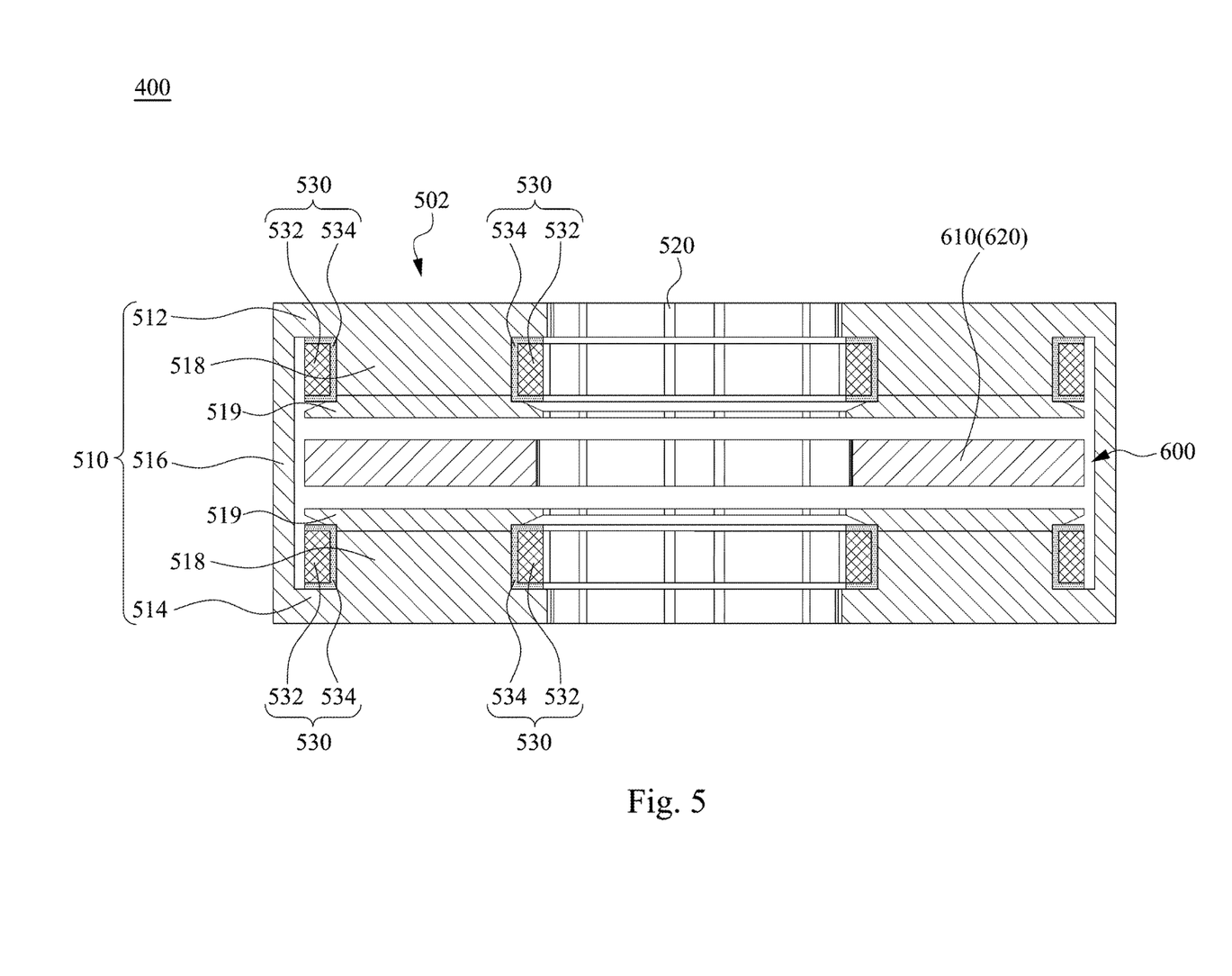
FIG. 5 is a cross-sectional view of some other embodiments of the axial flux machine of the invention.

Reference is made to FIG. 5, which is a cross-sectional view of some other embodiments of the axial flux machine of the invention. The axial flux machine 400 includes a modulated stator 500, a plurality of spacers 520, and a rotor 600. The modulated stator 500 includes a plurality of stator units 502, and the spacers 520 are arranged between the stator units 502 to isolate the stator units 502. Unlike the previous embodiments, each of the stator units 502 includes a magnetic core 510 and at least one winding 530. The magnetic core 510 has a first plate 512, a second plate 514, and a sidewall 516 connecting the first plate 512 to the second plate 514, in which the first plate 512 is substantially parallel to the second plate 514. The first plate 512, the second plate 514, and the sidewall 516 are one-piece formed and are made of soft magnetic composite material.

The rotor 600 includes a plurality of first magnetic pieces 610 and a plurality of second magnetic pieces 620 arranged alternatively. In some embodiments, the number of the rotor 600 is one, and the windings 530 are arranged at opposite sides of the rotor 600. Each of the magnetic core 510 includes a tooth 318 and a shoe 519. Each of the winding 530 includes a coil rack 534 and a plurality of coils 432 disposed on the coil rack 534. In some embodiments, the coil rack 534 is detachably assembled to the tooth 518, and then the shoe 519 is coupled to the tooth 518 to fasten the winding 530. In some other embodiments, the coil rack 534 is bonded on the first plate 512 and/or the second plate 514, and then the coils 532 are wounded on the coil rack 534 by a winding process. In yet some other embodiments, the number and the arrangement of the rotor 600 and the windings 530 can be modified according to different requirements. For example, there may be two rotors 600 between the first plate 512 and the second plate 514, and the windings 530 are respectively arranged between the first plate 512 and the upper rotor and between the second plate 514 and the lower rotor.

As described above, each sidewall 516 connects the corresponding first plate 512 to the corresponding second plate 514, thus a C-type magnetic line path is provided by the first plate 512, the sidewall 516, and the second plate 514. The magnetic lines of the first magnetic pieces 610 and the second magnetic pieces 620 pass through the C-type magnetic line path and form a plurality of C-type magnetic loops. For example, the magnetic lines emitted from the top surface of the first magnetic pieces 610 sequentially pass through the windings 530, the first plate 512, the sidewalls 516, the second plates 514, and the windings 530, and return to the bottom surface of the first magnetic pieces 610. The magnetic lines emitted from the bottom surface of the second magnetic pieces 620 pass through the windings 530, the second plates 514, the sidewalls 516, the first plates 512, and the windings 420, and return to the top surface of the second magnetic pieces 620. The modulated stator 500 can improve the assembly efficiency and provide better slot space factor and better cogging torque characteristic. The C-type magnetic loops can improve the power density of the axial flux machine 400.

As described above, the present disclosure provides an axial flux machine, and the stator of the axial flux machine is modulated and includes plural stator units. The windings can be respectively wound on the stator units during the winding process. Then the stator units are assembled to construct the modulated stator. Therefore, the operation spaces between the shoes for allowing the winding tool passing through can be shortened, and the winding angle of winding tool is no longer limited. The area of the shoes are also increased because the spaces therebetween are shortened, thus the slot space factor of the modulated stator can be increased accordingly. Furthermore, the cogging torque characteristic of the axial flux machine is also improved due to the increased shoe area. In some embodiments, the winding of the stator unit is detachably assembled at the magnetic core. Namely, the coils can be wound on the coil rack before the coil rack is coupled to the tooth of the stator unit, and thus the process of coils winding can be simplified. The magnetic loops of the axial flux machine pass through the sidewalls of the magnetic cores, such that the magnetic loops can be regarded as C-type magnetic loops, in side view. The C-type magnetic loops can provide better power density.

What is claimed is:

1. An axial flux machine comprising:
a modulated stator comprising a plurality of stator units, each of the stator unit comprising:
a first magnetic core comprising a first plate and a first sidewall, wherein a first end of the first plate is connected to a first end of the first sidewall, and a cross-section of the first magnetic core is L-shaped;
a first winding disposed in the first magnetic core;
a second magnetic core comprising a second plate and a second sidewall, wherein a first end of the second plate is connected to a first end of the second sidewall, and a cross-section of the second magnetic core is L-shaped, wherein a second end of the first sidewall is physically in contact with a second end of the second sidewall; and
a second winding disposed in the second magnetic core;
a plurality of spacers disposed to isolate the first magnetic cores and to isolate the second magnetic cores; and
a rotor disposed between the first magnetic core and the second magnetic core, the rotor comprising a plurality of first magnetic pieces and a plurality of second magnetic pieces arranged alternately, wherein magnetic flux lines of the first magnetic pieces and the second magnetic pieces respectively pass through the first sidewall and the second sidewall to construct a plurality of C-type magnetic loops with opposite magnetic directions.

2. The axial flux machine of claim 1, wherein the C-type magnetic loops comprise the magnetic flux lines of the first magnetic pieces and the second magnetic pieces, wherein
the magnetic flux lines of the first magnetic pieces are emitted from a top surface of the first magnetic pieces and sequentially pass through the first winding, the first plate, the first sidewall, the second sidewall, the second plate, and the second winding, and return to a bottom surface of the first magnetic pieces; and
the magnetic flux lines of the second magnetic pieces are emitted from a bottom surface of the second magnetic pieces and sequentially pass through the second winding, the second plate, the second sidewall, the first sidewall, the first plate, and the first winding, and return to a top surface of the second magnetic pieces.

3. The axial flux machine of claim 1, wherein the first winding and the second winding respectively comprise:
a coil rack bonded on the first plate or the second plate; and
a plurality of coils, wherein the coils are wound on the coil rack after the coil rack is bonded on the first plate or the second plate.

4. The axial flux machine of claim 3, wherein the first magnetic core and the second magnetic core respectively comprise:
a tooth disposed on the first plate or the second plate to position the coil rack; and
a shoe coupled to the tooth.

5. The axial flux machine of claim 1, wherein the first winding and the second winding respectively comprise a coil rack and a plurality of coils, wherein the first magnetic core and the second magnetic core respectively comprise:
a tooth disposed on the first plate or the second plate, wherein the coil rack is detachably coupled to the tooth after the coils are wound on the coil rack; and
a shoe coupled to the tooth for fastening the coil rack.

6. An axial flux machine comprising:
a modulated stator comprising a plurality of stator units, each of the stator units comprising:
a magnetic core comprising a first plate, a second plate, and a sidewall connecting the first plate to the second plate, wherein the first plate is substantially parallel to the second plate; and
at least one winding disposed in the magnetic core; and
a plurality of spacers disposed to isolate the magnetic cores; and
a rotor disposed in the modulated stator, the rotor comprising a plurality of first magnetic pieces and a plurality of second magnetic pieces arranged alternately, wherein magnetic flux lines of the first magnetic pieces and the second magnetic pieces respectively pass through the sidewall to construct a plurality of C-type magnetic loops with opposite magnetic directions.

7. The axial flux machine of claim 6, wherein the C-type magnetic loops comprise the magnetic flux lines of the first magnetic pieces and the second magnetic pieces, wherein
the magnetic flux lines of the first magnetic pieces are emitted from a top surface of the first magnetic pieces and sequentially pass through the first plate, the sidewall, and the second plate, and return to a bottom surface of the first magnetic pieces; and
the magnetic flux lines of the second magnetic pieces are emitted from a bottom surface of the second magnetic pieces and sequentially pass through the second plate, the sidewall, and the first plate, and return to a top surface of the second magnetic pieces.

8. The axial flux machine of claim 6, wherein the winding comprises:
a coil rack bonded on the first plate or the second plate; and
a plurality of coils, wherein the coils are wound on the coil rack after the coil rack is bonded on the first plate or the second plate.

9. The axial flux machine of claim 8, wherein the magnetic core comprises:
a tooth disposed on the first plate or the second plate to position the coil rack; and
a shoe coupled to the tooth.

10. The axial flux machine of claim 6, wherein the winding comprises a coil rack and a plurality of coils, wherein the magnetic core comprises:
a tooth disposed on the first plate or the second plate, wherein the coil rack is detachably coupled to the tooth after the coils are wound on the coil rack; and
a shoe coupled to the tooth for fastening the coil rack.

* * * * *